(12) United States Patent
Chang et al.

(10) Patent No.: US 7,755,608 B2
(45) Date of Patent: Jul. 13, 2010

(54) SYSTEMS AND METHODS OF INTERFACING WITH A MACHINE

(75) Inventors: Nelson Liang An Chang, San Jose, CA (US); Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1648 days.

(21) Appl. No.: 10/764,423

(22) Filed: Jan. 23, 2004

(65) Prior Publication Data

US 2005/0166163 A1 Jul. 28, 2005

(51) Int. Cl.
*G06F 3/033* (2006.01)
(52) U.S. Cl. .................................. 345/157; 345/175
(58) Field of Classification Search ................ 345/169, 345/173, 175, 7–9, 156
See application file for complete search history.

(56) References Cited

U.S. PATENT DOCUMENTS

| | | | |
|---|---|---|---|
| 5,168,531 A | 12/1992 | Sigel | |
| 5,239,373 A | 8/1993 | Tang et al. | |
| 5,334,991 A * | 8/1994 | Wells et al. | 345/8 |
| 5,617,312 A | 4/1997 | Iura et al. | |
| 5,682,332 A * | 10/1997 | Ellenby et al. | 702/150 |
| 5,732,227 A | 3/1998 | Kuzunuki et al. | |
| 5,767,842 A | 6/1998 | Korth | |
| 5,821,922 A | 10/1998 | Sellers | |
| 5,926,190 A * | 7/1999 | Turkowski et al. | 345/473 |
| 6,043,805 A | 3/2000 | Hsieh | |
| 6,084,557 A | 7/2000 | Ishida et al. | |
| 6,147,678 A | 11/2000 | Kumar et al. | |
| 6,160,899 A | 12/2000 | Lee et al. | |
| 6,198,485 B1 * | 3/2001 | Mack et al. | 345/419 |
| 6,204,852 B1 * | 3/2001 | Kumar et al. | 345/419 |
| 6,252,598 B1 | 6/2001 | Segen | |

(Continued)

FOREIGN PATENT DOCUMENTS

WO WO01/54110 7/2001

(Continued)

OTHER PUBLICATIONS

Leib B, Starner T, Ribarsky W, Wartell Z, Krum D, Singletary B, Hodges L (2000) Toward spontaneous interaction with the perceptive workbench. IEEE Comput Graph Appl 20(6):54-65.

(Continued)

*Primary Examiner*—Bipin Shalwala
*Assistant Examiner*—Steven E Holton

(57) ABSTRACT

Systems and methods of interfacing with a machine are described. In one aspect, sets of contemporaneous images of an interactive space are acquired from multiple respective fields of view. An input target is detected in the acquired images. Coordinates of the input target detected in the acquired images are computed. A spatiotemporal input data structure linking input target coordinates computed from contemporaneous images to respective reference times is constructed. The spatiotemporal input data structure is processed to identify an input instruction. The identified input instruction is executed on a machine. In another aspect, an image is displayed at a display location disposed between a viewing space and an interactive space, wherein the displayed image is viewable from a perspective in the viewing space. Images of the interactive space are acquired from at least one field of view. An input target is detected in the acquired images. Coordinates of the input target detected in the acquired images are computed. An input instruction is identified based on the computed input coordinates. The identified input instruction is executed on a machine.

63 Claims, 10 Drawing Sheets

U.S. PATENT DOCUMENTS

| | | | |
|---|---|---|---|
| 6,307,526 B1 * | 10/2001 | Mann | 345/8 |
| 6,408,257 B1 | 6/2002 | Harrington et al. | |
| 6,538,645 B1 | 3/2003 | Juang et al. | |
| 6,614,422 B1 | 9/2003 | Rafii et al. | |
| 6,753,879 B1 * | 6/2004 | Deleeuw | 345/629 |
| 6,771,294 B1 * | 8/2004 | Pulli et al. | 715/863 |
| 6,842,175 B1 * | 1/2005 | Schmalstieg et al. | 345/427 |
| 7,042,440 B2 * | 5/2006 | Pryor et al. | 345/158 |
| 2002/0036617 A1 | 3/2002 | Pryor | |
| 2002/0158873 A1 | 10/2002 | Williamson | |
| 2002/0163499 A1 | 11/2002 | Sauer | |
| 2003/0020707 A1 | 1/2003 | Kangas et al. | |
| 2003/0142067 A1 * | 7/2003 | Kurtenbach et al. | 345/156 |
| 2003/0179308 A1 | 9/2003 | Zamorano et al. | |

OTHER PUBLICATIONS

Kiyoshi Kiyokawa, Yoshinori Kurata, Hiroyuki Ohno, "An Optical See-through Display for Enhanced Augmented Reality", Poster Proceedings of Graphics Interface 2000 (GI 2000), pp. 10-11, Montreal, 2000.

Thad Starner, et al., The perceptive workbench: Computer-vision-based gesture tracking, object tracking, and 3D Reconstruction for Augmented Desks, Machine Vision and Applications, Springer-Verlag, 14: 59-71 (2003).

Gudrun Klinker, Klaus Ashlers, David Breen, Pierre-Yves Chevalier, Chris Crampton, Douglas Greer, Dieter. Koller, Andre Kramer, Eric Rose, Mihran Tuceryan and Ross Whitaker, "Confluence of Cumputer Vision and Interactive Graphics for Augmented Reality", [Figures], Presence: Teleoperations and Virtual Environments, vol. 6, No. 4, pp. 433-451, Aug. 1997.

Klaus H. Ahlers, Andr'e Kramer, David E Breen, Pierre-Yves Chevalier, Chris Crampton, Eric Rose, Mihran Tuceryan, Ross T. Whitaker and Douglas Greer, "Distributed Augmented Reality for Collaborative Design Applications", Eurographics '95 Proceedings (Elsevier Science Publishers B.V., Maastricht, NL, Aug. 1995) pp. 3-14.

Lievin M. and Keeve E., "Stereoscopic Augmented Reality System for Computer Assisted Surgery," CARS 2001, Berlin, Germany, Jun. 27-30, 2001.

Jun Rekimoto, "The Magnifying Glass Approach to Augmented Reality Systems", International Conference on Artificial Reality and Tele-Existence '95/Conference on Virtual Reality Software and Technology (ICAT/VRST '95).

Gaile Gordon et al., "The Use of Dense Stereo Range Data in Augmented Reality," International Symposium on Mixed and Augmented Reality (ISMAR 02), Sep. 30-Oct. 1, 2002.

Daniel Wagner, Dieter Schmalstieg, "First Steps Towards Handheld Augmented Reality," Proceedings of the 7th International Conference on Wearable Computers, White Plains, NY, USA, Oct. 21-23, 2003.

D. Mogilev, K. Kiyokawa, M. Billinghurst, "AR Pad: An Interface for Face-to-Face AR Collaboration," Proceedings of the ACM Conference on Human Factors in Computing Systems 2002 (CHI '02), Minneapolis, pp. 654-655, 2002.

Jun Rekimoto, "The World through the Computer: Computer Augmented Interaction with Real World Environments," ACM Symposium on User Interface Software and Technology (1995).

* cited by examiner

| Time | Camera A | Camera B | ... | Camera N | 3-D point (opt'l) | Color |
|---|---|---|---|---|---|---|
| $t_{c1}$ | $(u_{a,c1}, v_{a,c1})$ | $(u_{b,c1}, v_{b,c1})$ | ... | $(u_{k,c1}, v_{N,c1})$ | $(X_{c1}, Y_{c1}, Z_{c1})$ | $(r_{c1}, g_{c1}, b_{c1})$ |
| $t_{c1+1}$ | $(u_{a,c1+1}, v_{a,c1+1})$ | $(u_{b,c1+1}, v_{b,c1+1})$ | ... | $(u_{k,c1+1}, v_{N,c1+1})$ | $(X_{c1+1}, Y_{c1+1}, Z_{c1+1})$ | $(r_{c1+1}, g_{c1+1}, b_{c1+1})$ |
| ... | ... | ... | ... | ... | ... | ... |
| $t_{c1+p1}$ | $(u_{a,c1+p1}, v_{a,c1+p1})$ | $(u_{b,c1+p1}, v_{b,c1+p1})$ | ... | $(u_{k,c1+p1}, v_{N,c1+p1})$ | $(X_{c1+p1}, Y_{c1+p1}, Z_{c1+p1})$ | $(r_{c1+p1}, g_{c1+p1}, b_{c1+p1})$ |

| Time | Camera A | Camera B | Camera C | Color |
|---|---|---|---|---|
| 0.0 | (160,360) | (170,362) | (200,320) | (255,0,0) |
| 1.0 | (160,180) | (150,140) | (200,191) | (255,0,0) |
| 1.5 | (475,160) | (470,161) | (475,130) | (255,0,0) |
| 2.1 | (475,350) | (465,342) | (481,420) | (255,0,0) |
| 2.9 | (180,420) | (185,405) | (205,330) | (255,0,0) |

| Time | Camera A | Camera B | Camera C | Color |
|---|---|---|---|---|
| 4.5 | (430,220) | (460,260) | (420,310) | (0,255,0) |
| 4.6 | (300,150) | (320,120) | (210,150) | (0,255,0) |
| 6.4 | (160,200) | (140,250) | (150,200) | (0,255,0) |
| 7.8 | (400,220) | (440,255) | (380,250) | (0,255,0) |

# SYSTEMS AND METHODS OF INTERFACING WITH A MACHINE

BACKGROUND

Many different types of control and interface devices have been developed for inputting commands into a machine. For example, hand-manipulated interface devices, such computer mice, joysticks, trackballs, and keyboards, commonly are used to input instructions into a computer by manipulating the interface device. Such interface devices allow a user to control movement of a virtual pointer, such as a cursor, across a computer screen, select or move an icon or other virtual object displayed on the computer screen, and open and close menu items corresponding to different input commands.

Recently, video image based machine interfacing systems are being developed. Many of these interfacing systems are based on the detection of an input command in images captured by a single video camera. In one approach, the light-emitting element of a pen light is used to control the displayed position of a virtual pointer on a computer screen. At least one input button, such as a button on the light pen or a key on a computer keyboard, typically is used in this approach to perform the functions of the corresponding buttons on a computer mouse. In another approach, a video camera is mounted above the keyboard portion of the computer to capture images of a computer user's hand that is placed within a selected observation zone. Cursor control circuitry monitors the presence, configuration and movement of the user's hand based on the captured images. When the user's hand is placed in a first predetermined configuration and moved into and through the observation zone, the cursor control circuitry switches the computer from a keyboard typing mode to a cursor positioning mode, tracks movement of the hand through the observation zone, and correspondingly moves the cursor on the computer display screen. When the user's hand is placed in a predetermined second configuration, the cursor control circuitry causes a cursor "pick" function to be generated in conjunction with the repositioned cursor. In response to placement of the user's hand in a third predetermined configuration, the circuitry switches the computer from its cursor positioning mode back to its previous keyboard typing mode.

Other hand gesture based video image machine interfacing systems have been proposed. One approach analyzes human hand and finger motions in images captured by a video camera. These motions are interpreted as user input operations on a virtual input device. The resulting optical user-computer interface complements the visual screen-to-user path with a hand-to-image data acquisition link from the user to the processor unit. The interface allows different types of manually-operated input devices (mouse, keyboard, etc.) to be emulated.

Another hand gesture based video image machine interfacing approach uses images of hand gestures to control a computer. In this approach, motion of the user's hand is tracked in a three-dimensional coordinate system with five degrees of freedom. The system includes an image processor and at least two cameras. During operation of the system, hand images received from the cameras are processed to recognize predefined hand gestures. The computer utilizes two-dimensional images obtained by each camera to derive three-dimensional position and orientation coordinates of the extended finger. The recognized hand gestures are interpreted as commands, which are sent to an application being executed by the computer.

SUMMARY

The invention features systems and methods of interfacing with a machine.

In one aspect of the invention, sets of contemporaneous images of an interactive space are acquired from multiple respective fields of view. An input target is detected in the acquired images. Coordinates of the input target detected in the acquired images are computed. A spatiotemporal input data structure linking input target coordinates computed from contemporaneous images to respective reference times is constructed. The spatiotemporal input data structure is processed to identify an input instruction. The identified input instruction is executed on a machine.

In another aspect of the invention, an image is displayed at a display location disposed between a viewing space and an interactive space, wherein the displayed image is viewable from a perspective in the viewing space. Images of the interactive space are acquired from at least one field of view. An input target is detected in the acquired images. Coordinates of the input target detected in the acquired images are computed. An input instruction is identified based on the computed input coordinates. The identified input instruction is executed on a machine.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below capture real-time spatiotemporal information relating to activity within an interactive space imaged by one or more imaging devices. In some embodiments, the spatiotemporal information is encapsulated in a multidimensional input data structure that can be processed to extract multi-dimensional properties (e.g. three-dimensional position at every time instance; N two-dimensional coordinates at every time instance for N cameras) of input gestures, curves, and shapes that a user may wish to convey to or exchange with a machine. The spatiotemporal input data structure may be processed to synthesize new views with high efficiency. In some embodiments, images are displayed at a display location disposed between a viewing space and an interactive space to provide an intuitive user-machine interface that automatically registers a user's interactions with the interactive space with virtual reality images or mixed reality images that are displayed at the display location.

I. System Overview

Figure 1:
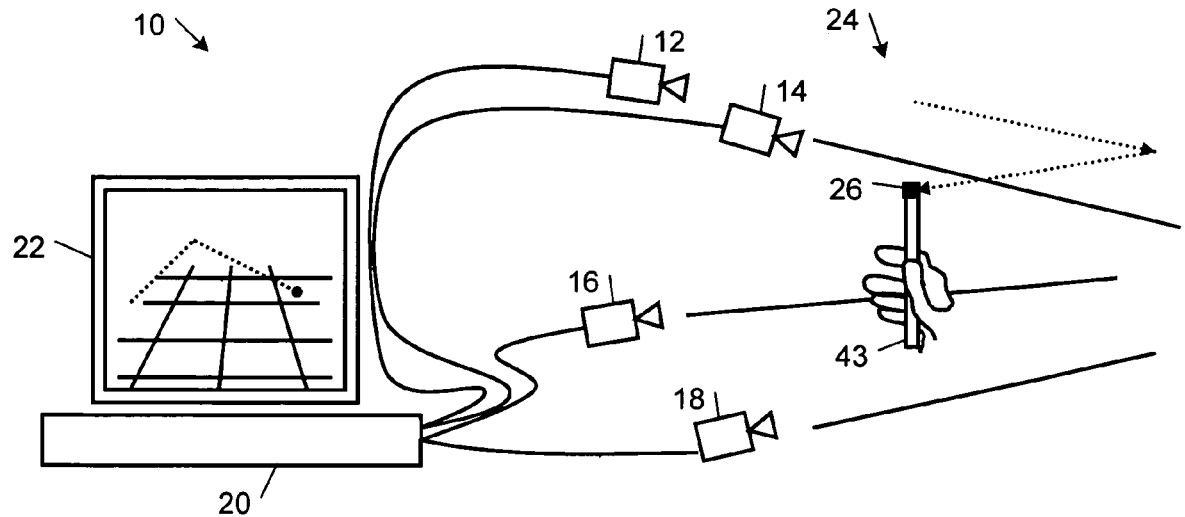
FIG. 1 is a diagrammatic view of a user's hand holding an input target for communicating instructions to an embodiment of a machine interface system.

FIG. 1 shows an embodiment of a machine interface system 10 that includes multiple imaging devices 12, 14, 16, 18, a processing system 20, and a display 22. The machine interface system 10 may be used to provide any of a wide variety of different types of user interface environments, including virtual reality environments that allow users to visualize, manipulate and interact with machines and data, and augmented reality environments that augment natural feedback to users with simulated cues. As used herein, the term "virtual reality" refers to an artificial environment that is experienced by sensory stimuli generated by a machine and in which a user's actions partially determine what happens in the artificial environment. The terms "mixed reality" and "augmented reality" both refer to an environment that is experienced by a combination of artificial sensory stimuli that is generated by a machine and real sensory stimuli that is acquired from the real world. Exemplary application areas for system 10 include medicine, entertainment, computer-aided design, training, manufacturing, education, and information sharing.

The imaging devices 12-18 are configured to acquire sets of images of an interactive space 24 from multiple respective fields of view. Each field of view corresponds to a respective area that is imaged by a respective imaging device. The intersection of the fields of view of all of the imaging devices 12-18 defines an interactive space 24. The terms imaging devices, image sensors, and cameras are used interchangeably herein. The imaging devices 12-18 typically remain fixed in place and are oriented toward the interactive space 24. In some implementations, the imaging devices 12-18 are controlled externally by processing system 20. Exemplary imaging devices include computer-controllable digital cameras (e.g., a Kodak DCS760 camera), USB video cameras, and Firewire/1394 cameras.

The processing system 20 is configured to acquire sets of contemporaneous images of the interactive space 24 from the imaging devices 12-18, detect an input target 26 in the acquired images, and compute coordinates of the input target in the acquired images. In some embodiments, the processing system 20 is configured to construct a spatiotemporal input data structure linking input target coordinates computed from contemporaneous images to respective reference times. The processing system 20 processes the spatiotemporal input data structure to identify input instructions that are executed on a machine, which may be integrated with the processing system 20 or may be remotely-controlled by processing system 20.

In general, the processing system 20 is not limited to any particular hardware or software configuration, but rather it may be implemented in any computing or processing environment, including in digital electronic circuitry or in computer hardware, firmware, device driver, or software. In some implementations, processing system 20 is implemented, at least in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

The display 22 is any type of display that is compatible with the application environment for which system 10 is designed. In some embodiments, display 22 is configured to present virtual reality images (i.e., images generated by processing system 20) or mixed reality images (i.e., images containing real content acquired by imaging devices 12-18 and virtual content generated by processing system 20).

II. Methods Of Interfacing With A Machine

Figure 2:
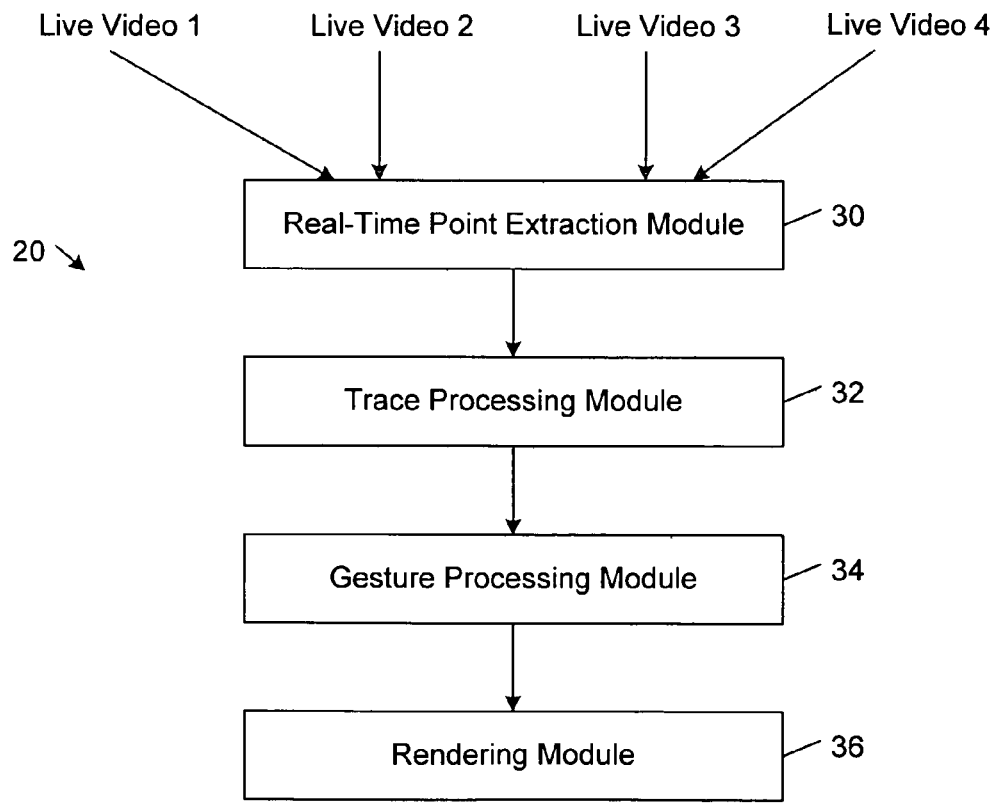
FIG. 2 is a block diagram of an embodiment of a processing system for interfacing with a machine.

FIG. 2 shows modules of an embodiment of the processing system 20 that includes a real-time point extraction module 30, a trace processing module 32, a gesture processing module 34, and a rendering module 36. In general, modules 30-36 are not limited to any particular hardware or software configuration, but rather they may be implemented in any computing or processing environment, including in digital electronic circuitry or in computer hardware, firmware, device driver, or software. These modules 30-36 may be embedded in the hardware of any one of a wide variety of electronic devices, including desktop computers, laptop computers, and portable electronic devices (e.g., digital still image camera, digital video cameras, mobile phones and personal digital assistants).

Figure 3:
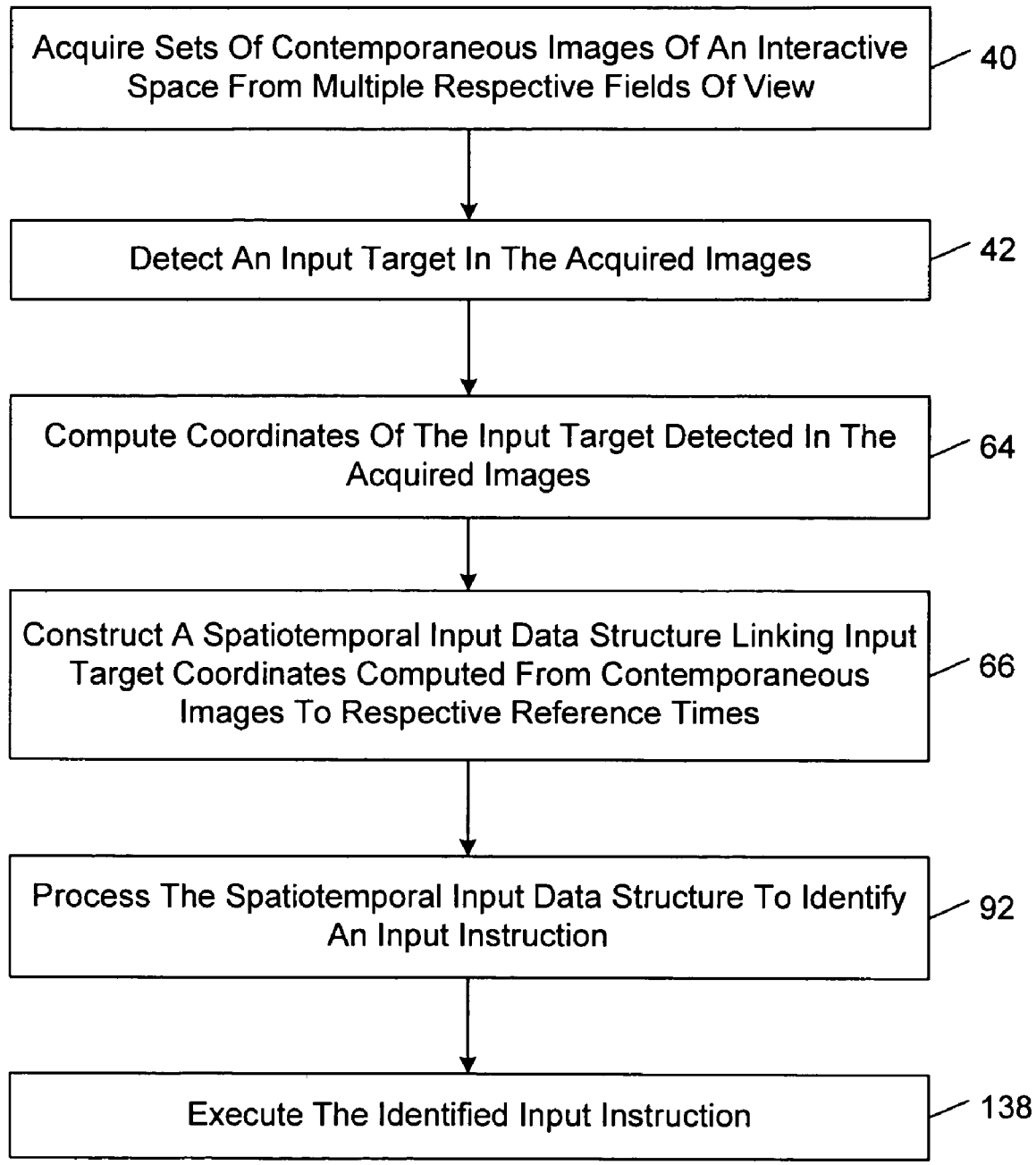
FIG. 3 is a flow diagram of an embodiment of a method of interfacing with a machine.

FIG. 3 shows an implementation of a method by which processing system 20 provides a user-machine interface. Initially, processing system 20 synchronously acquires sets of contemporaneous images of interactive space 24 from each of the imaging devices 12-18 (step 40). In the embodiment illustrated in FIG. 2, the images that are acquired by the processing system 20 are shown as respective live video feeds (Live Video 1, Live Video 2, Live Video 3, and Live Video 4) that are generated by the imaging devices 12-18.

The real-time point extraction module 30 detects an input target in the acquired images (step 42). In general, the input target may be any localized feature that may be distinguished from other features in the images of the interactive space 24 to convey an intended user instruction in the interactive space 24. In the embodiment illustrated in FIG. 1, the input target 26 is a light-emitting element (e.g., a light-emitting diode or an incandescent bulb) that is disposed at the end of an elongated pointer device 43 and is configured to emit light in a wavelength range detectable by imaging devices 12-18. In other embodiments, the input target may be a reflective element, such as a retroreflective element, that may be disposed on a manipulable device (e.g., a pointer, wand, or other hand-held device) or worn by a user. In some embodiments, the input target may be a part of the user's body (e.g., the user's hand or one or more of the user's fingers) that may be detected by processing system 20 in images captured by imaging devices 12-18.

In some embodiments, real-time point extraction module 30 performs real-time pixel thresholding by determining whether the color of each pixel in the acquired images is greater than a predefined, empirically-determined threshold value. In some implementations, the pixel values that are used for pixel thresholding correspond to mappings of the pixel color values to corresponding grayscale pixel values. An example of such a grayscale mapping G is given by equation (1):

$$G = 0.299 \times r + 0.587 \times g + 0.114 \times b \quad (1)$$

where r, g and b are red, green and blue values for each pixel. In other implementations, the pixel intensities may correspond to the values of a single color (e.g., green color values in a red-green-blue color representation of the pixels) or a metric (e.g., the $l_2$ norm) that is computed based on pixel color.

In each image captured by a given imaging device i (where i has an integer value in a range from 1 to N, which is equal to the number of imaging devices in system 10), the locations of pixels with grayscale values above the threshold value are averaged to identify the centroid location $(u_i, v_i)$ of the input target. If no pixels are above the threshold value for the given imaging device i, the data acquired from the given imaging device is ignored in subsequent processing steps described below.

In some implementations, the imaging devices 12-18 capture raw Bayer pattern images each of which is a spatial 2×2 pattern where the upper left corresponds to the red pixel, upper right is green, lower left is also green, and lower right is blue. Color at every pixel location is computed using demosaicing algorithms to combine these different color values. The values that are output from the imaging devices 12-18 may be, for example, 8-bit numbers or 10-bit numbers, which have values in a range from 0 (no light) to 255 or 1023 (maximum brightness). In these embodiments, the raw pixel data is thresholded to detect the locations of the input target in the acquired images (i.e., color conversion is not performed).

Figure 4:
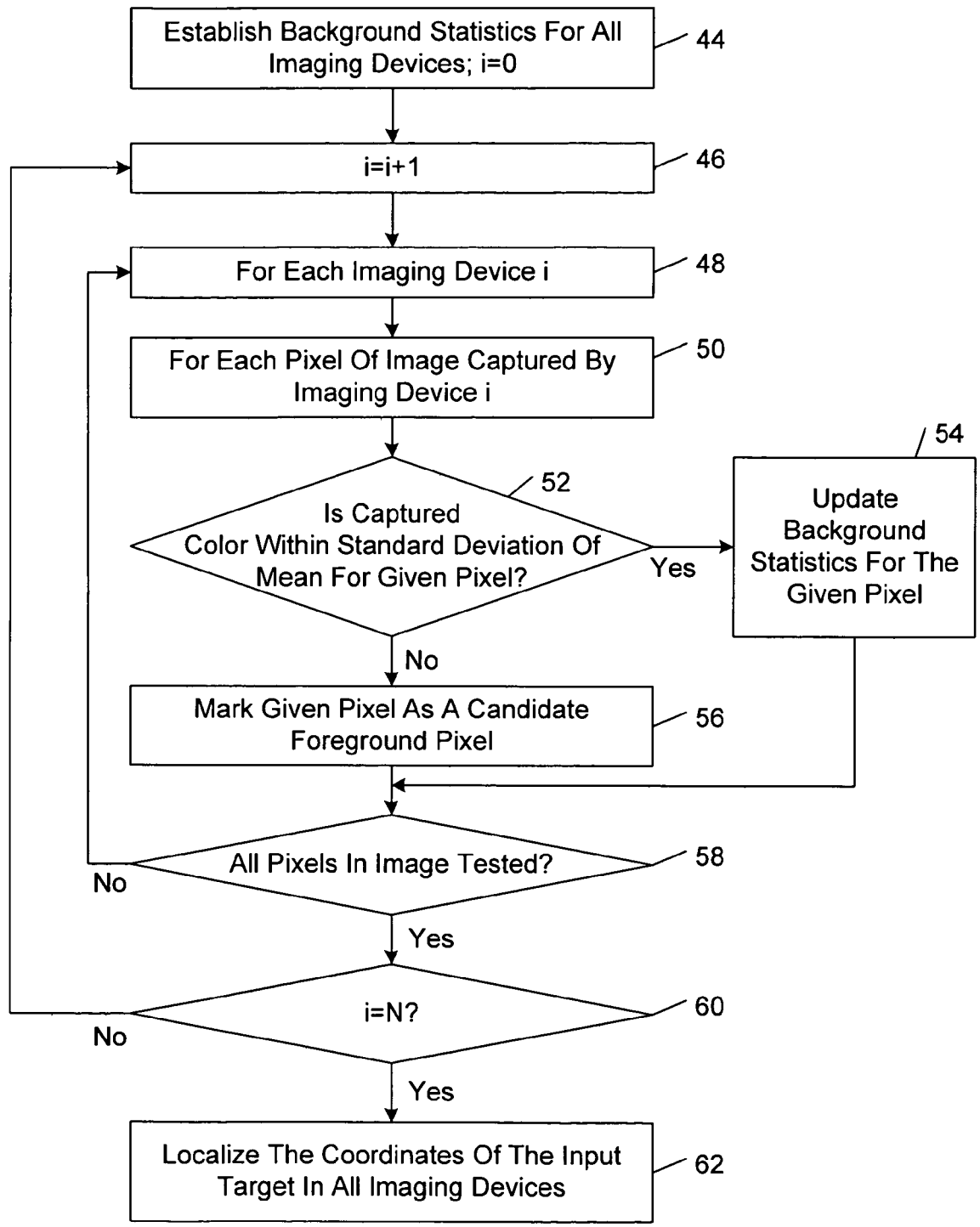
FIG. 4 is a flow diagram of an embodiment of a method of detecting an input target in images acquired by the machine interface embodiment of FIG. 1.

FIG. 4 shows an embodiment of another method of detecting the input target in the acquired images. In accordance with this embodiment, background statistics are established for each imaging device 12-18 (step 44). The background statistics may be computed in accordance with known foreground segmentation image processing techniques. The background statistics may be established initially by capturing multiple frames of the interactive space 24 without the input target, and computing image statistics for the pixels of each imaging device 12-18. The following process is performed for each set of contemporaneous images acquired from imaging devices 12-18. For each pixel of a given camera i, if the pixel color is within the standard deviation of the mean pixel color (steps 46-52), the background statistics of the pixel are updated (step 54). In one implementation, the most recent pixel color samples (e.g., the four most recent pixel color samples) are stored in memory. During each background statistic update (step 54), the oldest pixel color value is replaced with the current color value, the mean color value is updated, and the standard deviation value is updated. If the color of a given pixel is not within the standard deviation of the mean pixel color (step 52), the pixel is marked as a candidate foreground pixel (step 56). After all of the pixels have been tested (step 58) in each contemporaneous image (step 60), the input target is identified by localizing or clustering the coordinates of the input target in all of the contemporaneous images (step 62). A foreground segmentation image processing technique may be used to identify and cluster points corresponding to the input target.

Referring to FIGS. 1-3, the real-time point extraction module 30 also computes coordinates of the input target detected in the acquired images (step 64). In some embodiments, the centroid location of points corresponding to the input target is used to represent the location of the input target in each image. The coordinates of the centroid of the input target location in each field of view may be tracked across image frames captured by the imaging devices 12-18. In some implementations, one or more noise reduction filters are applied to the coordinate data before the centroid coordinates are computed.

Figures 5, 6:
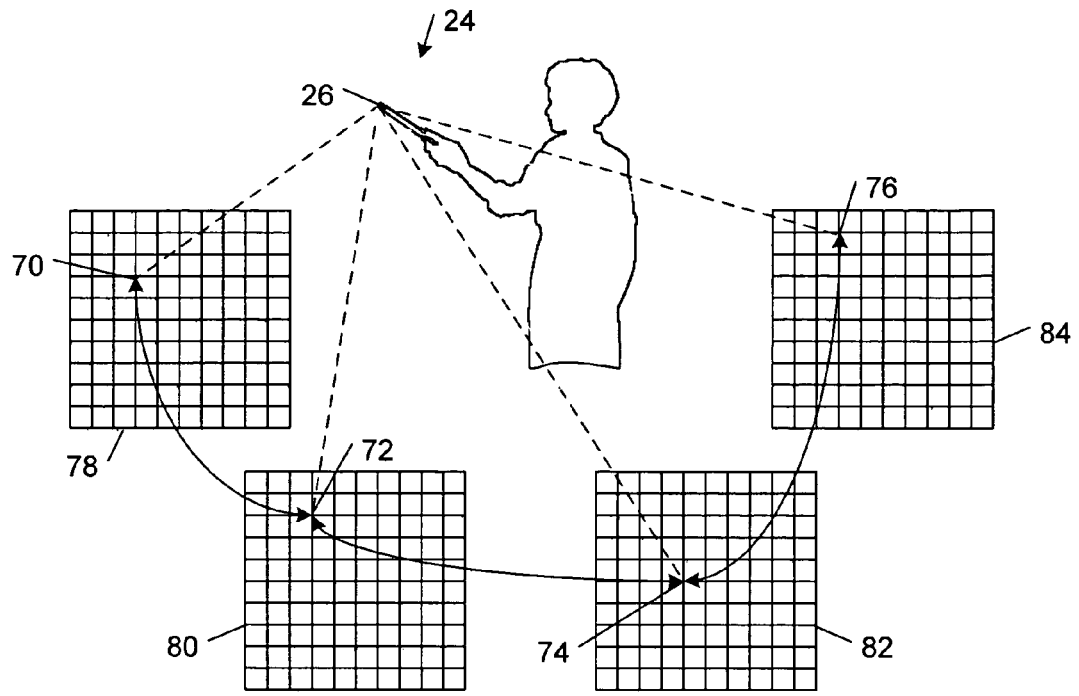
FIG. 5 is a diagrammatic view of coordinates of a user-held input target in a set of contemporaneous images acquired by the machine interface embodiment of FIG. 1.
FIG. 6 shows an embodiment of a spatiotemporal input data structure linking input target coordinates computed from contemporaneous images to respective reference times.

Referring to FIGS. 3, 5, and 6, after computing coordinates of the input target in the acquired images (step 64), the real-time point extraction module 30 constructs a spatiotemporal input data structure linking input target coordinates computed from contemporaneous images to respective reference times (step 66).

As shown in FIG. 5, at any given time, the three-dimensional location of the input target 26 in the interactive space 24 appears at respective two-dimensional locations 70, 72, 74, 76 in the fields of view 78, 80, 82, 84 of the imaging devices 12, 14, 16, 18. These respective locations 70-76 readily may be correlated with each other because the computed input target coordinates correspond to a single point or group of points in each field of view 78-84. In this way, the correspondence problem between any pair of fields of view is solved automatically. The respective reference time to which each set of contemporaneous input target coordinates is linked may correspond to the synchronized capture time of the corresponding contemporaneous images or it may correspond to some other unique reference time. As used herein, "contemporaneous images" refer to images originating at times that are within the same time window that does not overlap the time windows of non-contemporaneous images. In the illustrated embodiments, contemporaneous images are images that are captured by imaging devices 12-18 at the same time or at times within the same time window that is shorter than the inter-frame capture rate of the imaging devices 12-18.

The resulting correspondence mappings among the fields of view 78-84 may be used to interpolate different views of the scene. In some implementations, the correspondence mapping also may be used to compute three-dimensional coordinates of the input target 26 in the interactive space 24 after the imaging devices 12-18 have been calibrated. For example, if the imaging devices are calibrated and the input target is visible in at least two fields of view, the three-dimensional location of the input target in the interactive space 24 may be computed using a least squares reconstruction technique that computes a best-fit three-dimensional model for the input target that matches the two-dimensional images acquired by the imaging devices 12-18.

In general, camera calibration is used to account for differences from a mathematical camera model and to determine an accurate relationship among the coordinate systems of all the imaging devices. The former emphasizes camera parameters, known as the intrinsic parameters, such as focal length, aspect ratio of the individual sensors, the skew of the capture plane and radial lens distortion. The latter, known as the extrinsic parameters, refer to the relative position and orientation of the different imaging devices.

In some implementations, the calibration process is performed as a separate preprocessing step before the three-dimensional input coordinates of the input target in the interactive space 24 are captured. In these embodiments, a rigid, patterned planar reference surface is used. In some embodiments, the reference surface covers most, if not all, of the interactive space 24. The system 10 then automatically establishes the correspondence mapping for a set of points on the planar surface through image analysis and processing. World coordinates are assigned for these points. For example, in some embodiments, it may be assumed that the points fall on a rectangular grid defined in local coordinates with the same dimensions and aspect ratio as the projector's coordinate system and that the plane lies in the z=1 plane. Only the points on the planar surface that are visible in all the imaging devices 12-18 are used for calibration. The correspondence information and the world coordinates are then fed into a nonlinear optimizer to obtain the calibration parameters for the imaging devices 12-18. The resulting calibration parameters define the captured image quantities as three-dimensional coordinates with respect to the plane at z=1. After calibration, the surface is replaced by the input target for three-dimensional trace tracking.

In some embodiments, the calibration process described in U.S. application Ser. No. 10/356,858, filed Feb. 3, 2003, entitled "MULTIFRAME CORRESPONDENCE ESTIMATION," which is incorporated herein by reference, may be used. In other embodiments, the cameras of machine interface system 10 may be calibrated by using the traces themselves as input to a nonlinear optimizer.

Referring to FIG. 6, in some embodiments, real-time point extraction module 30 stores in a table data structure 90 the reference times $(t_j)$, the computed two-dimensional coordinates $(u_{ij}, v_{ij})$ the input target in each field of view (Camera i), the three-dimensional coordinates $(X_j, Y_j, Z_j)$ of input target in the interactive space (if computed), and the color values $(r_j, g_j, b_j)$ of the input target location. Each row of the table data structure corresponds to the input target position in each field of view and the color data for a respective reference time $(t_j)$.

After the spatiotemporal input data structure 90 has been constructed by the real-time point extraction module 30, the spatiotemporal input data structure 90 is processed to identify an input instruction (step 92; FIG. 3). Initially, trace processing module 32 processes the spatiotemporal input data structure 90 to identify traces of the input target in the interactive space. Each trace corresponds to a set of data items in the spatiotemporal input data structure that are connected in time and space. In some implementations, traces are segmented based on detected state change events. Exemplary state change events include an inability to detect the input target in any of the fields of view of imaging devices 12-18 for a prescribed length of time, a receipt of a state change input signal (e.g., a signal triggered by depressing a key of a computer keyboard or a button on a computer mouse), and a recognition of certain prescribed input traces representing state change commands.

Figures 7A, 7B:
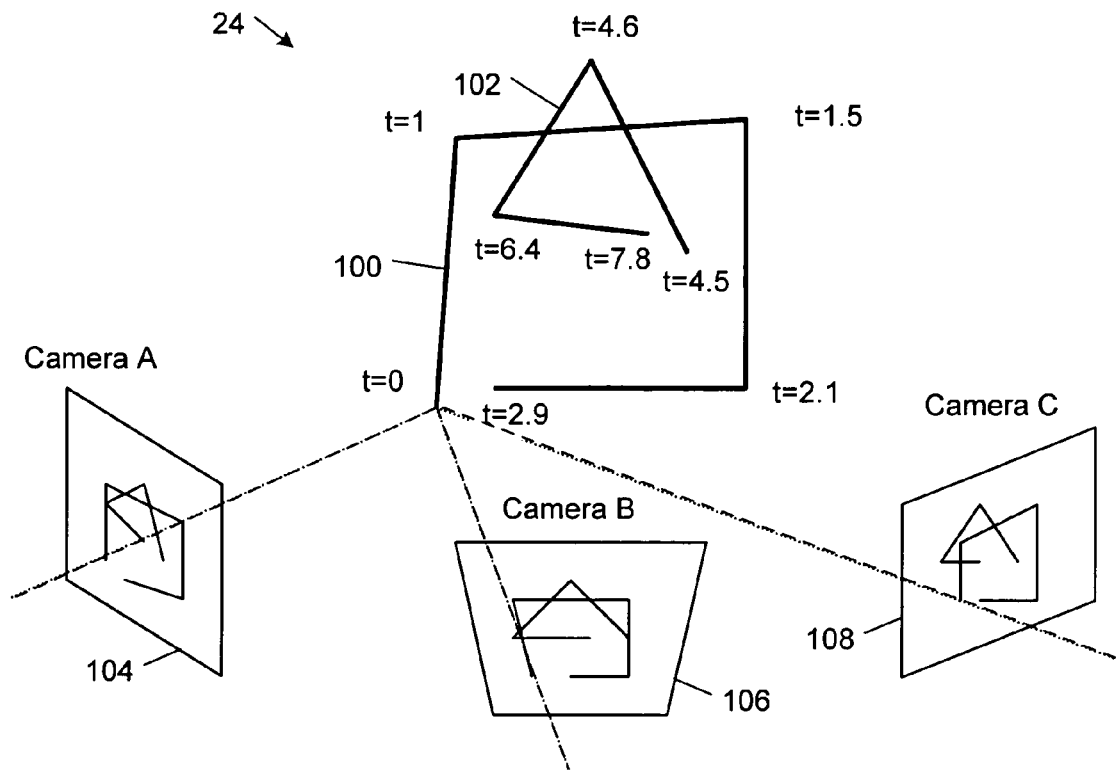
FIG. 7A is a diagrammatic view of two different traces of an input target in an interactive space and three contemporaneous images of the interactive space acquired from three different respective fields of view.
FIG. 7B shows an embodiment of a spatiotemporal input data structure segmented into two traces corresponding to the two input target traces shown in FIG. 7A.

Referring to FIGS. 7A and 7B, in one illustrative example, two traces 100, 102 of the input target 26 in interactive space 24 are created by a user over a period from t=0.0 seconds to t=7.8 seconds. Each trace 100, 102 is captured in a respective series of sets of contemporaneous images from three fields of view 104, 106, 108. Trace 100 is captured in a series of contemporaneous images at times t=0.0, 1.0, 1.5, 2.1, and 2.9, and trace 102 is captured in a series of images at times t=4.5, 4.6, 6.4, and 7.8. Each trace 100, 102 is represented by a respective subset 110, 112 of data in a spatiotemporal input data structure 114 that is generated by the processing system 20 based on the images acquired from the fields of view 104-108. In particular, trace 100 is represented by the sets of contemporaneous color values and two-dimensional coordinates corresponding to the locations of the input target in each of the fields of view 104-108 at the respective references times t=0.0, 1.0, 1.5, 2.1, and 2.9. Similarly, trace 102 is represented by the sets of contemporaneous color values and two-dimensional coordinates corresponding to the locations of the input target in each of the fields of view 104-108 at the respective references times t=4.5, 4.6, 6.4, and 7.8.

As shown in FIG. 7B, each set 110, 112 of trace data is linked to a respective trace pointer, which is stored in a trace pointer data structure 116 that is separate and distinct from the input data structure 114 in the illustrated embodiment. In other embodiments, the pointer data structure is an integral part of the input data structure. The trace pointer data structure 116 allows the processing system 20 to readily identify the spatiotemporal input data corresponding to a given trace for rapid processing.

Figure 8:
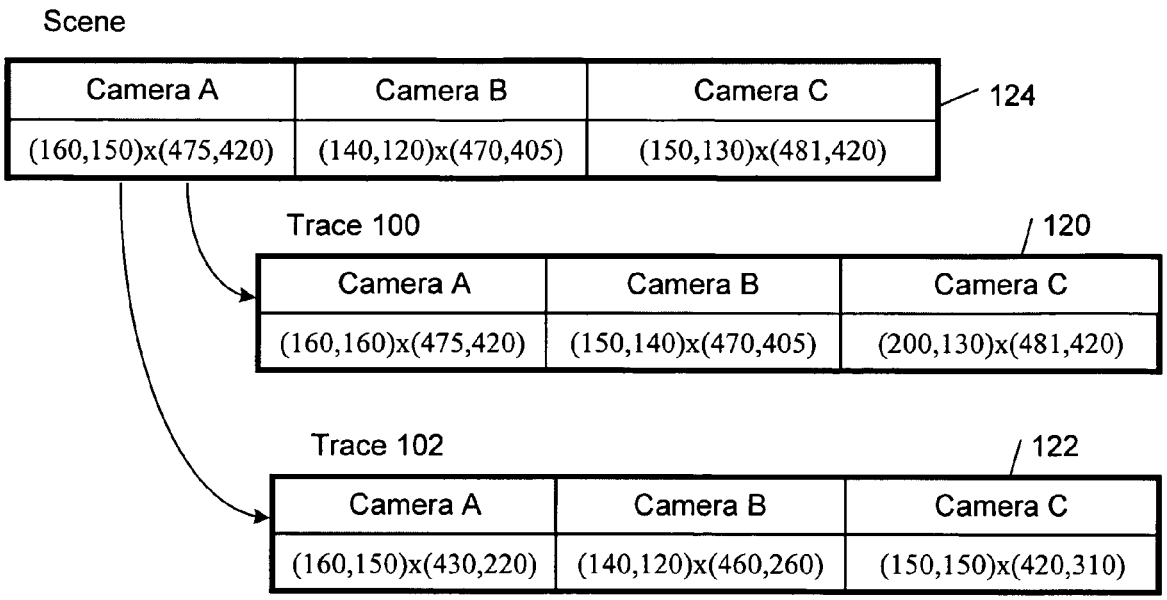
FIG. 8 shows a mapping from coordinates of bounding regions computed for the entire region of interest in the interactive space shown in FIG. 7A to respective bounding regions computed for the two different traces shown in FIG. 7A.

Referring to FIG. 8, in some embodiments, in addition to identifying multidimensional traces in the spatiotemporal input data structure, trace processing module 32 computes bounding regions for each trace that increase the rate at which the traces may be processed and queried. In one implementation, the bounding regions corresponding to two-dimensional rectangular boxes defined by the upper left and lower right coordinates of each trace in each of the fields of view of the imaging devices. The bounding boxes may be represented at different scales. For example, in the implementation illustrated in FIG. 8, bounding boxes are computed in every field of view for the entire scene (i.e., the volume of the interactive space 24 encompassing all of the traces of interest) and for each trace (i.e., the volume of the interactive space 24 encompassing each trace individually). Thus, with reference to the example of FIGS. 7A and 7B, both traces 100, 102 are encompassed by the bounding boxes defined by upper left and lower right scene coordinates (160,150)×(475,420) in the field of view of Camera A 104, (140,120)×(470,405) in the field of view of Camera B 106, and (150,130)×(481,420) in the field of view of Camera C 108. Trace 100 is encompassed by the bounding boxes defined by upper left and lower right coordinates (160,160)×(475,420) in the field of view Camera A 104, (150,140)×(470,405) in the field of view Camera B 106, and (200,130)×(481,420) in the field of view Camera C 108. Trace 102 is encompassed by the bounding boxes defined by upper left and lower right coordinates (160,150)×(430,220) in the field of view Camera A 104, (140, 120)×(460,260) in the field of view Camera B 106, and (150,150)×(420,310) in the field of view Camera C 108.

As shown in FIG. 8, in some implementations, each set of trace bounding box data is stored in a respective data structure 120, 122 that is linked to a separate and distinct data structure 124 containing the bounding box data computed for the scene of interest. In some embodiments, the bounding box data is also an integral part of the input data structure.

Referring back to FIG. 2, after the trace processing module 32 has identified one or more traces of the input target in the interactive space 24 based on the spatiotemporal input data structure, the gesture processing module 34 interprets the identified traces to determine the intended meaning of a particular configuration or movement of the input target by the user. In some embodiments, traces are interpreted by the gesture processing module 34 based on the context in which the gesture is presented by the user. The context depends on the current state of the gesture processing module 34, and the location of the input target 26 in the interactive space 24 relative to locations of any virtual objects (e.g., "hot spots") in a virtual space correlated with the interactive space 24. The states of gesture processing module 34 change in response to detected state change events. As mentioned above, exemplary state change events include an inability to detect the input target in any of the fields of view of imaging devices 12-18 for a prescribed length of time, a receipt of a state change input signal (e.g., a signal triggered by depressing a key of a computer keyboard or a button on a computer mouse), and a recognition of certain prescribed input traces representing state change commands.

Figure 9:
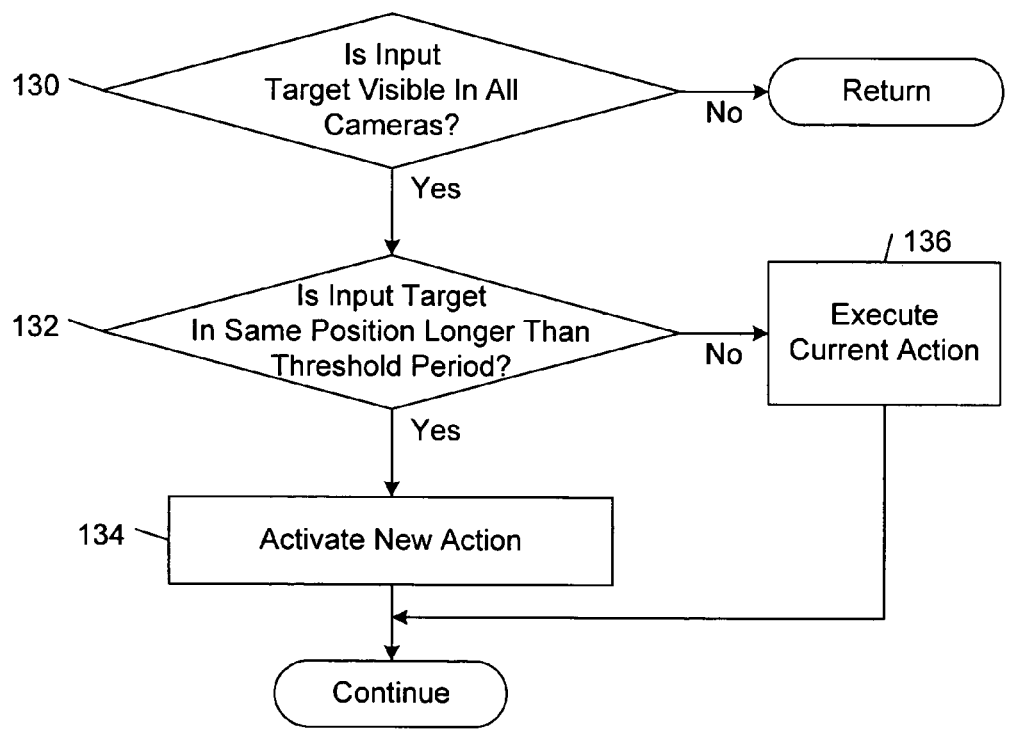
FIG. 9 is a flow diagram of an embodiment of a method of processing a spatiotemporal input data structure to identify an input instruction.

Referring to FIGS. 1, 2 and 9, in some embodiments, gesture processing module 34 is configured to detect a "hold" gesture and to change the operating mode of machine interface system 10 in response to detection of the hold gesture. In these embodiments, the hold gesture is detected only if the input target is visible in all fields of view (step 130). If the input target is visible in all fields of view (step 130) and the hold gesture is detected (e.g., when the input target remains in the same location in the interactive space for longer than a predetermined period, such as, 1 second) (step 132), a new action corresponding to the gesture is activated depending on the current state or operating mode of gesture processing module 34 (step 134). For example, when the hold gesture is detected at a location corresponding to a "hot spot", the gesture processing module 34 invokes the action corresponding to the hot spot. When the hold gesture is detected in a "drawing mode", the gesture processing module 34 toggles the drawing state and starts a new drawing. When the hold gesture is detected in a "moving mode", the gesture processing module 34 marks a reference point for changing the viewpoint presented on display 22. When the hold gesture is detected in a "selecting" mode, a valid input target location is compared with bounding boxes for fast selection of an active trace. If the input target in not located in the same location for longer than the threshold period (step 132), the standard action for the current operating mode is executed (step 136).

Referring back to FIG. 3, after an input instruction has been identified (step 92) the processing system 20 executes the identified input instruction (step 138). For example, in one exemplary implementation, gesture processing module 34 changes its operating mode in accordance with a hot spot when a current trace intersects a region of the interactive space corresponding to the virtual location of the hot spot. The hot spot location may be defined in the coordinate system corresponding to the spatiotemporal input data structure. In some implementations, the color of a given hot spot appearing in display 22 becomes brighter as long as the input target intersects the hot spot, providing a visual hovering effect. If the hold gesture is detected when the input target intersects a hot spot, the operating mode of gesture processing module 34 changes to the operating mode associated with the hot spot.

Figure 10A:
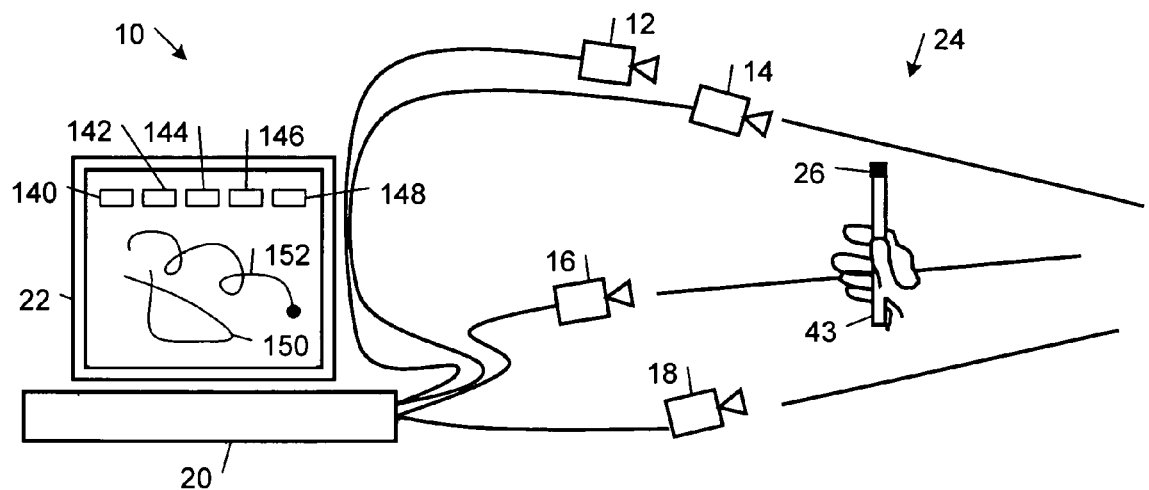
FIG. 10A is a diagrammatic view of a machine interface embodiment configured to allow a user to draw curves on a display by tracing an input target along three-dimensional paths in an interactive space.
Figure 10B:
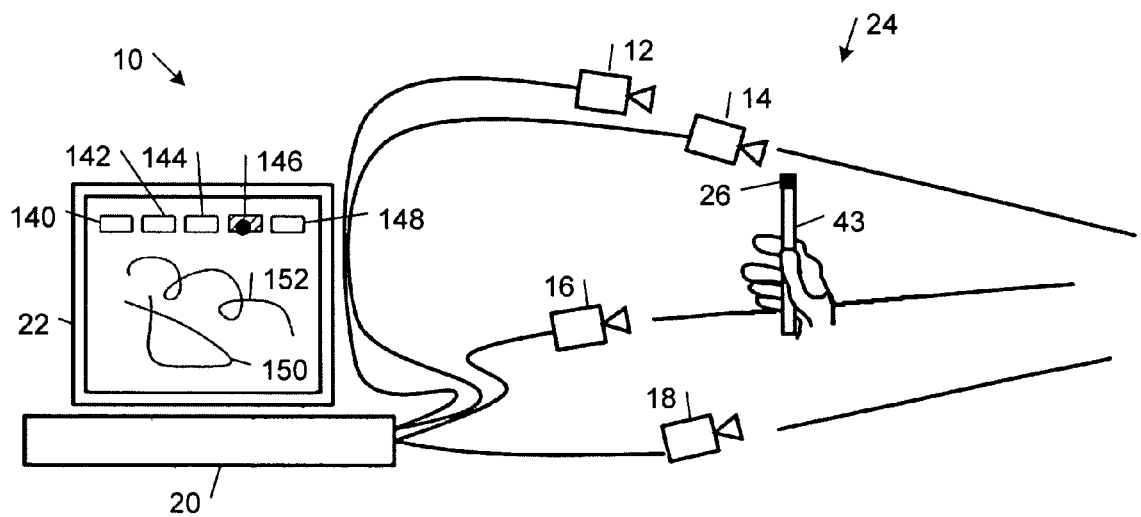
FIG. 10B is a diagrammatic view of an implementation of the machine interface embodiment of FIG. 10A configured to allow a user to input a machine instruction by activating a virtual machine instruction input corresponding to a predefined three-dimensional region in the interactive space.

Referring to FIGS. 10A and 10B, in some embodiments, gesture processing module 34 interprets a trace of the input target in the interactive space based on the location of the trace relative to the locations of virtual objects or hot spots in a virtual space correlated with the interactive space. In these embodiments, display 22 presents to a user a menu of hot spots 140, 142, 144, 146, 148 corresponding to respective operating mode actions. Among the exemplary types of operating mode actions that might be respectively associated with hot spots 140-148 are the following:

Change color palette. The user can choose the desired drawing color by exhibiting the hold gesture over the hot spot. The activated hot spot may prompt the system to generate a menu of color options or may directly represent one of many predetermined colors that the user can select.

Select nearest trace. A given drawing may consist of multiple traces, one of which the user may select. As the user moves the pointer in the interactive space, the closest trace to the pointer's position briefly lights up. If the user demonstrates the hold gesture over a trace, the given trace is then selected. A fast query algorithm may be used to select the nearest trace/segment for uncalibrated cameras. The pointer's coordinates are compared with the scene bounding boxes to determine whether they are within threshold. If so, the pointer's coordinates are subsequently compared with each trace's bounding box. The error distance from the pointer to the trace is computed for all traces that are within a predetermined distance away from the pointer. The algorithm returns the trace which minimizes the error distance. For calibrated cameras, one can apply a similar algorithm operating on the three-dimensional coordinates directly.

Move selected trace. If one of the traces has been selected, the user may move this trace independently from the others. After activating this mode with the hold gesture, the user can change the location of the selected trace according to view interpolation; details about view interpolation are provided below. A hold gesture anywhere in the interaction space provides the starting reference point for the system. As the user moves the pointer around, the system updates the view interpolation parameter(s) accordingly. For example, in the two camera case, a lateral movement adjusts the (single) view interpolation parameter. With the updated view interpolation parameter(s), the system can recompute the location of the selected trace through simple linear combination.

Move entire scene. The user may change the viewpoint of the entire scene (i.e., all traces). For example, the user may rotate the virtual scene to see a different perspective. As with the previous mode, the user specifies a starting reference point for the system by an initial hold gesture anywhere in the interaction space. Subsequent pointer movement will cause the system to update the view interpolation parameter(s), hence the entire scene.

Delete selected trace. The user may choose to delete one of the traces in the scene. After first selecting the desired trace using the "select nearest trace" option, the user deletes the trace from the scene data structure with a simple hold gesture over this hot spot.

Delete last trace. The user can remove the most recently added trace from the scene data structure by performing the hold gesture over this hot spot.

Delete all traces. The user can remove all traces from the scene with the hold gesture over this hot spot. In this case, the virtual scene is completely blank.

A user may activate a drawing mode by providing the hold gesture at a location in the interactive space 24 corresponding to the virtual location of drawing mode hot spot 140. The user may then provide the hold gesture at a selected location in the interactive space 24 where a new drawing trace 150 will begin. Gesture processing mode 34 then allows the user to begin drawing at the selected location. After the drawing trace 150 is completed, the user may again present the hold gesture to instruct gesture processing module 34 that the current drawing trace 150 is completed. The user may then provide the hold gesture at a new selected location in the interactive space where a new drawing trace 152 will begin. After the drawing trace 152 is completed, the user may again present the hold gesture to instruct gesture processing module 34 that the current drawing trace 152 is completed. As show in FIG. 10B, the user may then provide the hold gesture at a location in the interactive space 24 corresponding to the virtual location of hot spot 146 to change the operating mode of gesture processing module 34.

The gesture processing module 34 also may be configured to detect other gestures that allow users to: input alphanumeric characters by drawing characters or words in the three-dimensional interactive space; manipulate a three-dimensional viewpoint presented in display 22 by selecting a location in the interactive space and dragging the input target to a different location the interactive space; change the color of objects presented in display 22; and drag and rotate objects presented in display 22. The gestures may be interpreted in a way that controls movement in a 3-D environment. For instance, the pointer could be "centered" and then as the user moves it (up/down/left/right/forward/back), the view of the environment changes as a function of how far the pointer is from the reference position.

In some embodiments, the gesture processing module 34 includes a learning mode of operation that allows the user to associate a machine-implemented operation with a new spatiotemporal gesture input by the user. In these embodiments, the gesture processing module 34 stores characteristic features of the new spatiotemporal gesture in a spatiotemporal data structure. The stored data structure may then be compared to new gestures that are input by the user to detect a user's invocation of the gesture.

Referring back to FIGS. 1 and 2, the rendering module 36 controls the presentation of images on display 22. Rendering module 36 updates the user interface, including the status of hot spots. In some implementations, rendering module 36 is configured to blend virtual image data with image data obtained from one or more of the imaging devices 12-18. The visual feedback is the virtual data, the user interface, the live/real video, and the pointer position. In one approach, the output image is rendered with the real video feed and then the transformed virtual scene and user interface are superimposed. To display correct depth ordering between real and virtual elements, depth information may be estimated for the real elements. The output image may be displayed in three-dimensions as a polarized stereo pair, as a side-by-side anagram, with a lenticular display, or using other techniques.

Rendering module 36 is configured to present captured image data from the viewpoint of one of the imaging devices 12-18. For example, in the uncalibrated case, the successive pairs of data points are connected by two-dimensional line segments and are drawn directly in the image plane using computer graphics scanline algorithms. The user can optionally lay these line segments over real-live video so that the captured data are displayed in a proper context. In implementations in which the cameras are calibrated, the relevant data points may be connected by three-dimensional line segments and presented in a three-dimensional viewer. In another implementation, the points also may appear as a "cloud" of data by displaying them without connecting line segments.

In some embodiments, rendering module 36 allows the user to use the input target 26 to move the viewpoint of at least part of the scene presented on display 22. In uncalibrated camera implementations, rendering module 36 performs real-time linear interpolation of traces so that a synthesized view derived from the imaging devices may be presented on display 22. For N cameras, there are N−1 view interpolation parameters that sum to 1 and are specified by the user's movement (e.g. with two cameras, there is one lateral parameter; with three cameras, there are two areal parameters; etc). The coordinates of the virtual data are a linear combination of the N coordinates given by equation (2):

$$\begin{bmatrix} u \\ v \end{bmatrix} = \begin{bmatrix} a_1 u_1 + a_2 u_2 + \ldots + a_{N-1} u_{N-1} \\ a_1 v_1 + a_2 v_2 + \ldots + a_{N-1} v_{N-1} \end{bmatrix} \qquad (2)$$

To render the virtual scene, every point in every trace goes through the above transformation to determine the new coordinates. Neighboring pairs of the transformed points are drawn as connected line segments. The appropriate color is applied to each of these line segments. In the end, one obtains the view of the virtual scene rendered at the desired viewpoint. The user interface elements (e.g. hotspots) may be similarly transformed or else added directly to the rendered image. This approach provides a fast and simple way to display a new view of the correspondence information that conveys motion parallax cues. Color may be similarly transformed. In calibrated camera embodiments, a global three-dimensional affine transformation is applied directly to the three-dimensional coordinates.

In some embodiments, multi-dimensional view interpolation is performed as follows. These embodiments handle arbitrary camera configurations and are able to synthesize a large range of views. In these embodiments, two or more cameras are situated in a space around the interactive space. Each camera corresponds to an anchor view that may contribute to a synthetic view that is generated. Depending upon the specific implementation, three of more anchor views may contribute to each synthetic view.

As explained in detail below, a user may specify a desired viewpoint for the synthetic view through a graphical user interface. The anchor views define an interface shape that is presented to the user, with the viewpoint of each anchor view corresponding to a vertex of the interface shape. In the case of three anchor views, the interface shape corresponds to a triangle, regardless of the relative positions and orientations of the anchor views in three-dimensional space. When there are more than three anchor views, the user may be presented with an interface polygon that can be easily subdivided into adjacent triangles or with a higher dimensional interface shape (interface polyhedron or hypershape). An example of four anchor views could consist of an interface quadrilateral or an interface tetrahedron. The user can specify an increased number of synthesizable views as the dimension of the interface shape increases, however higher dimensional interface shapes may be harder to visualize and manipulate. The user may use a pointing device (e.g., a computer mouse) to select a point relative to the interface shape that specifies the viewpoint from which a desired synthetic view should be rendered. In some embodiments, this selection also specifies the appropriate anchor views from which the synthetic view should be interpolated as well as the relative contribution of each anchor view to the synthetic view. The user also may use the input target pointer to specify the synthetic view.

The following embodiments correspond to a two-dimensional view interpolation implementation. In other embodiments, however, view interpolation may be performed in three or higher dimensions.

In the following description, it is assumed that two or more cameras are arranged in an ordered sequence around the interactive space. An example of such an arrangement is a set of cameras with viewpoints arranged in a vertical (x-y) plane that is positioned along the perimeter of a rectangle in the plane and defining the vertices of an interface polygon. With the following embodiments, the user may generate synthetic views from viewpoints located within or outside of the contour defined along the anchor views as well as along this contour. In some embodiments, the space of virtual (or synthetic) views that can be generated is represented and parameterized by a two-dimensional (two-dimensional) space that corresponds to a projection of the space defined by the camera configuration boundary and interior.

Figure 11:
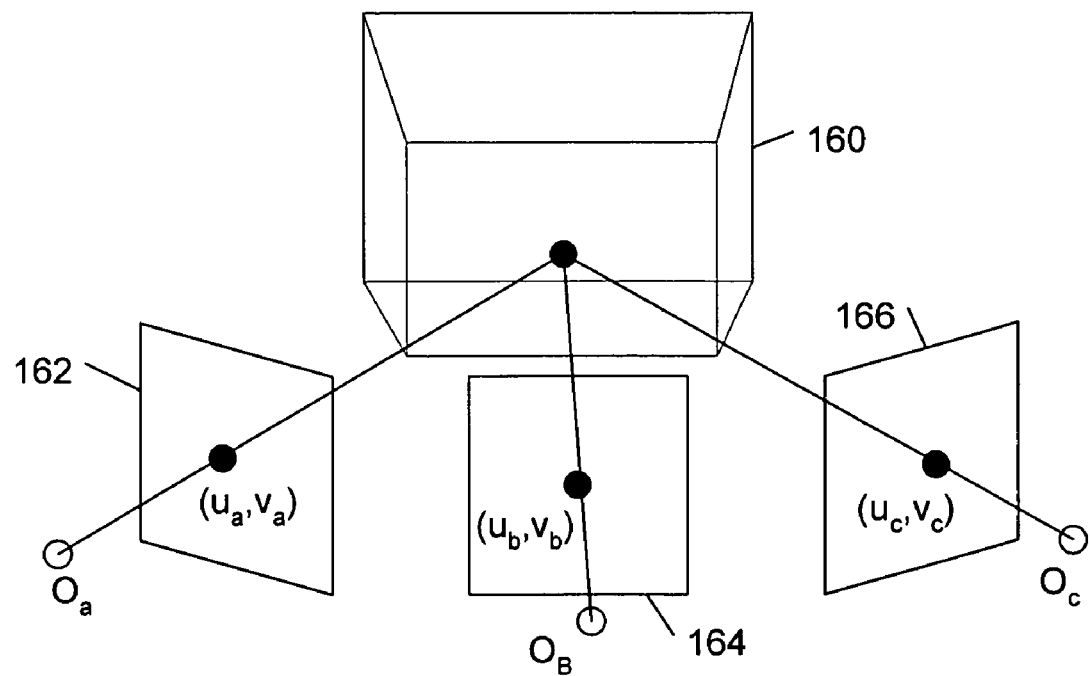
FIG. 11 is a diagrammatic perspective view of a three-camera system for capturing three respective anchor views of an object.

Referring to FIG. 11, in some embodiments, a set of three cameras a, b, c with viewpoints $O_a$, $O_b$, $O_c$ arranged in a plane around an interactive space 160. Images of the interactive space 160 are captured at respective capture planes 162, 164, 166 and a spatiotemporal data structure of correspondence mappings between the cameras are computed in accordance with one or more of the above-described embodiments. The pixel coordinate information captured at the capture planes 162, 164, 166 is denoted by $(u_a, v_a)$, $(u_b, v_b)$, $(u_c, v_c)$, respectively. The collection of corresponding triplets determines the vertices of an interface triangle.

In some of these embodiments, the space corresponding to the interface triangle is defined with respect to the above-described spatiotemporal data structure representation as follows.

Identify locations in the spatiotemporal data structure that have contributions from all the cameras (i.e., portions of the scene visible in all cameras).

For all the rows in the spatiotemporal data structure that are visible in all cameras, a function, such as mean or median, of the correspondence vectors is computed. For example, in one embodiment, all the points in the first camera are averaged, all the points in the second camera are averaged, etc. Finally, the resulting coordinates in each of the cameras are used to compute an interface triangle as described below.

Figure 12:
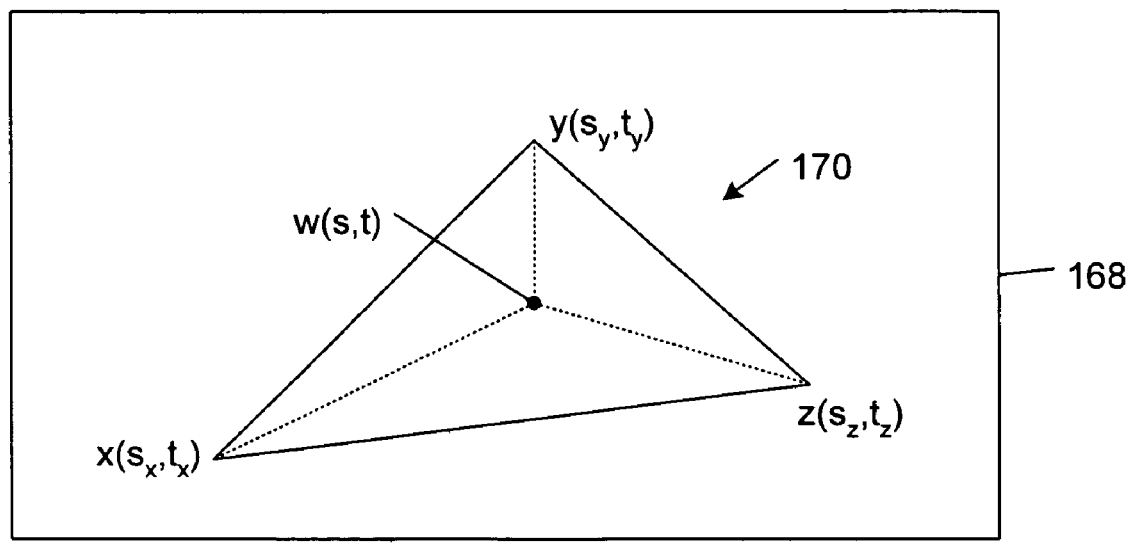
FIG. 12 is a diagrammatic view of an exemplary interface triangle.

Referring to FIG. 12, in some embodiments, a user may select a desired view of the scene through a graphical user interface 168 displaying an interface triangle 170 with vertices representing the viewpoints of each of the camera of FIG. 11. For more than three anchor views, the graphical user interface 168 would display to the user either an interface polygon with vertices representing the viewpoints of the anchor views or a projection of a higher dimension interface shape. The interface triangle 170 gives an abstract two-dimensional representation of the arrangement of the cameras. The user may use the input target to select a point w(s,t) relative to the interface triangle 170 that specifies the viewpoint from which a desired synthetic view should be rendered and the contribution of each anchor view to the desired synthetic view. The user may perform linear view interpolation between pairs of anchor views by traversing the edges of the interface triangle. The user also may specify a location outside of the interface triangle in the embodiment of FIG. 12, in which case the system would perform view extrapolation (or view synthesis).

Figure 13:
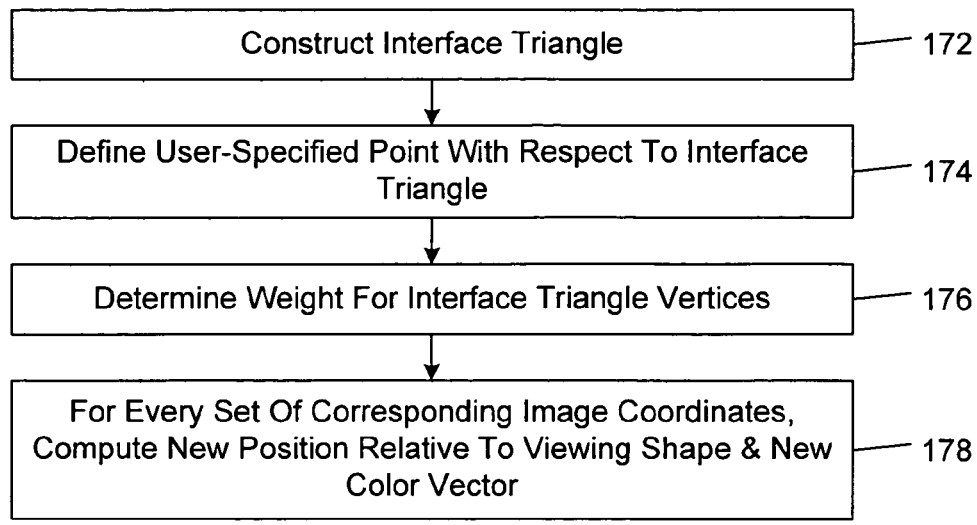
FIG. 13 is a flow diagram of an embodiment of a method of two-dimensional view interpolation.

Referring to FIG. 13, in some embodiments, the Barycentric coordinates of the user selected point are used to weight the pixel information from the three anchor views to synthesize the desired synthetic view, as follows:

Construct an interface triangle $\Delta xyz$ (step 172): Let x=(0, 0). Define y-x to be the median of correspondence difference vectors between cameras b and a, and likewise, z-y for cameras c and b.

Define a user-specified point w=(s,t) with respect to $\Delta xyz$ (step 174).

Determine Barycentric coordinates $(\alpha, \beta, \gamma)$ corresponding respectively to the weights for vertices x, y, z (step 176):

Compute signed areas (SA) of sub-triangles formed by the vertices of the interface triangle and the user selected point w, i.e., SA(x,y,w), SA(y,z,w), SA(z,x, w), where for vertices $x=(s_x,t_x)$, $y=(s_y,t_y)$, $z=(s_z,t_z)$, $$SA(x,y,z)=\tfrac{1}{2}((t_y-t_x)s_z+(s_x-s_y)t_z+(s_yt_x-s_xt_y))$$

Note that the signed area is positive if the vertices are oriented clockwise and negative otherwise.

Calculate (possibly negative) weights $\alpha$, $\beta$, $\gamma$ based on relative subtriangle areas, such that $\alpha = SA(y,z,w)/SA(x,y,z)$ $\beta = SA(z,x,w)/SA(x,y,z)$ $\gamma = SA(x,y,w)/SA(x,y,z) = 1 - \alpha - \beta$ For every triplet (a,b,c) of corresponding image coordinates, use a weighted combination to compute the new position p=(u,v) relative to $\Delta abc$ (step 178), i.e.

$u = \alpha u_a + \beta u_b + \gamma u_c$ $v = \alpha v_a + \beta v_b + \gamma v_c$ The new color vector for the synthetic image is interpolated similarly. For example, assuming the color of anchor views a, b, c are given by $c_a$, $c_b$, $c_c$, the color d of the synthetic image is given by:

$d = \alpha^* c_a + \beta^* c_b + \gamma^* c_c$

In some embodiments, more than three anchor views are available for view interpolation. In these embodiments, a graphical user interface presents to the user an interface shape of two or more dimensions with vertices representing each of the anchor views.

Occlusions may occur when synthesizing new views of multiple surfaces. To properly handle the depth ordering, the depth information may be computed for the surfaces. Alternatively, the epipolar geometry between the reference coordinate system and the synthesized view may be computed, the view's epipole may be projected to the reference coordinate system, and the rendering order may be rearranged based on this projection (instead of only raster scan).

The above-described view interpolation embodiments automatically perform three-image view interpolation for interior points of the interface triangle. View interpolation along the perimeter is reduced to pair-wise view interpolation. These embodiments also execute view extrapolation for exterior points. In these embodiments, calibration is not required. In these embodiments, a user may select an area outside of the pre-specified parameter range. In some embodiments, the above-described method of computing the desired synthetic view may be modified by first sub-dividing the interface polygon into triangles and selecting the closest triangle to the user-selected location. The above-described view interpolation method then is applied to the closest triangle.

In other embodiments, the above-described approach is modified by interpolating among more than three anchor views, instead of first subdividing the interface polygon into triangles. The weighted contribution of each anchor view to the synthetic view is computed based on the relative position of the user selected location P to the anchor view vertices of the interface shape. The synthetic views are generated by linearly combining the anchor view contributions that are scaled by the computed weights. In some embodiments, the weighting function is based on the $l_2$ distance (or $l_2$ norm) of the user selected location to the anchor view vertices. In other embodiments, the weighting function is based on the respective areas of subtended shapes.

To summarize, for a three-camera example, a user specifies the desired position with respect to a two-dimensional interface triangle and this action provides the necessary weights $(\alpha,\beta,\gamma)$ for linear interpolation. Each camera is weighted based on the weights $(\alpha,\beta,\gamma)$ to determine the new location $(u,v)$ of a given data point in accordance with equation (3):

$$(u,v)=(\alpha u_a+\beta u_b+\gamma u_c, \alpha v_a+\beta v_b+\gamma v_c) \qquad (3)$$

The new coordinates of all data points are then used to compute the appropriate two-dimensional line segments.

In the calibrated case, the desired three-dimensional view is provided and true three-dimensional transformations are performed on the data points. Three-dimensional line segments on the transformed data points are then formed and drawn.

Figure 14:
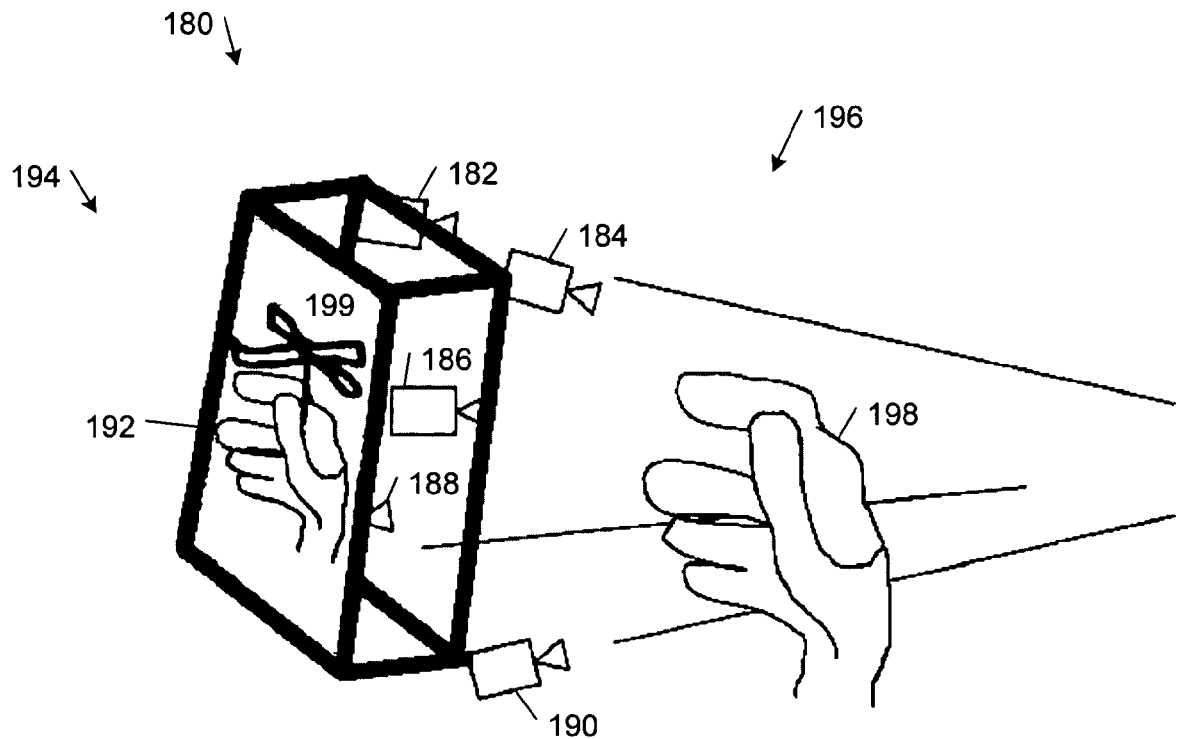
FIG. 14 is a diagrammatic view of an embodiment of a machine interface system that is configured to display images at a display location disposed between a viewing space and an interactive space being imaged from multiple fields of view.

FIG. 14 shows an implementation 180 of the machine interface system 10, in which multiple imaging devices 182, 184, 186, 188, 190 are positioned behind a display 192 such that a virtual reality image or an augmented reality image may be displayed between a viewing space 194 and an interactive space 196. The image presented on display 192 is viewable from a perspective in the viewing space 194. In some implementations, display 192 is a computer display (e.g., a liquid crystal display (LCD), a tablet-type of personal computer, a notebook computer display, projected display, or a microdisplay) and the imaging devices 182-190 are cameras (e.g., digital video cameras). The machine interface system 180 system provides a relatively low cost and potentially portable solution for combining real and synthetic data in a way that serves to augment real world information with additional pertinent information directly on the same display.

The machine interface system 180 may be used in any one of numerous application environments, including rapid CAD and design, three-dimensional/four-dimensional modeling, visualization, virtual interaction and manipulation, multi-user collaboration, and virtual three-dimensional shopping. The machine interface system 180 also provides a user with appropriate visual cues for immersive interaction. For example, the machine interface system 180 provides intuitive visual feedback that is particularly applicable to the multidimensional sketching application described above.

In the embodiment illustrated in FIG. 14, imaging device 186 is attached behind the display 192 and is oriented to capture images from a field of view that is parallel to the plane in which images are displayed, thereby simulating the view through the display in accordance with a paradigm of digitally "looking through the screen" as though it were transparent. This "magnifying glass" effect is also possible when the field of view is not perfectly parallel to the plane in which the images are displayed.

To simulate augmented reality, a user takes the machine interface system 180 and reaches behind the display 192 to interact with the interactive space 24 located behind the display. The display 192 continually updates the view captured by the central camera 186 to simulate the real view (including the user's hand 198), and additional synthetic information may be computed and redefined with respect to the central camera's coordinate system and overlaid as well. This approach gives the user the feeling of manipulating a real object while still maintaining the necessary visual cues. The machine interface system 180 may be used for three- or four-dimensional sketching where the user controls an input target (e.g., a light pen) that is easily detectable in all the cameras 182-190. The user can simulate drawing anywhere in the interactive space 196 by moving the input target around, whereby the cameras capture and store the multidimensional spatiotemporal information. This information can be used as the drawing itself or as part of a gesture to, for example, rotate the scene. In some implementations, the simulated viewpoint of the synthetic data is updated while the real world context is unchanged.

A method of using the machine interface system 180 to capture and display information is as follows:
  (Optional) Calibrate the cameras 182-190 to estimate internal camera parameters as well as relative camera positions.
  Recompute the synthetic data (e.g., three-dimensional model data, multiframe correspondences) with respect to the central camera 186. For example, it is possible that the user wishes to simulate rotating a synthetic object 199 defined in the interactive space 196.
    For uncalibrated camera implementations, the above-described multiframe view interpolation techniques may be used to synthesize views between at least two or more cameras. In these embodiments, a new view corresponds to the weighted combination of the color and shape information from each camera.
    For calibrated camera implementations, the three-dimensional coordinates of every point are computed and three-dimensional transformations are applied to determine the new coordinates with respect to the central camera's viewpoint.

The current real video frame of the central camera is combined with the recomputed synthetic data to generate the new augmented reality frame for this time instance. In some implementations, an alpha or depth type of map, which is defined for every pixel in the central camera's field of view, is used to blend the desired depth ordering of the real and synthetic data.

In implementations in which there is no central camera located directly behind the display 192, another camera that is attached to the display 192 may be used, or view interpolation and/or three-dimensional transformations may be used to synthesize the real world from the perspective of that camera. In some implementations, motion parallax issues are remedied by performing motion tracking on the input target. In some implementations, real or virtual coordinate grids are used to provide frames of reference.

Figure 15A:
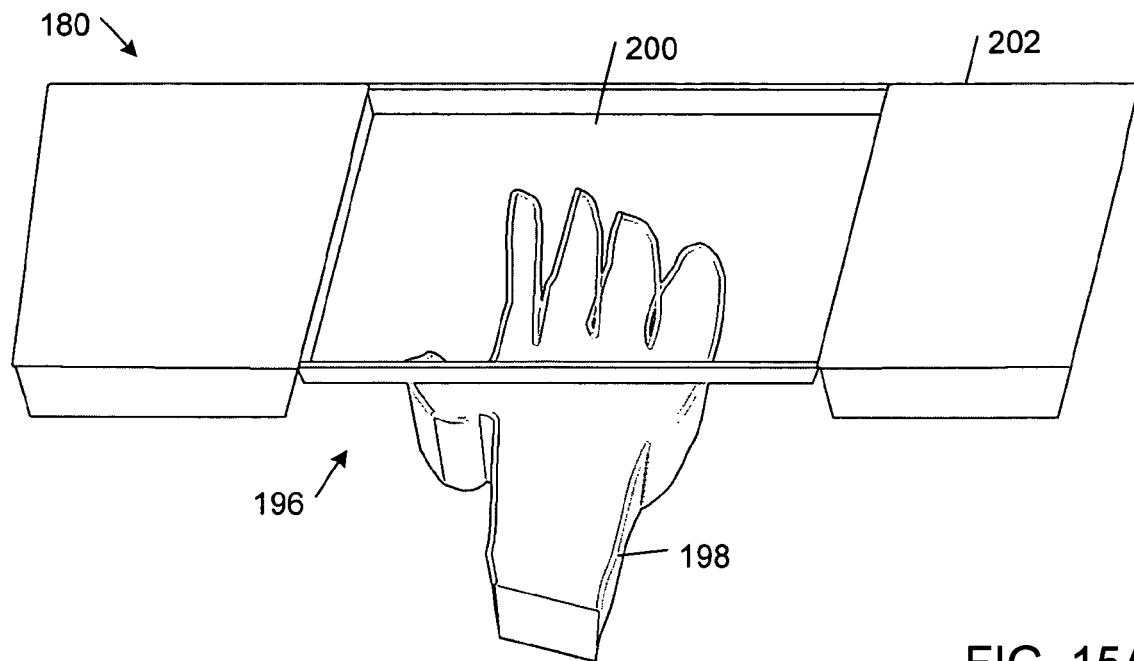
FIG. 15A is an implementation of the machine interface embodiment of FIG. 14 in which the images are displayed on a monitor embedded in a desktop above the interactive space.
Figure 15B:
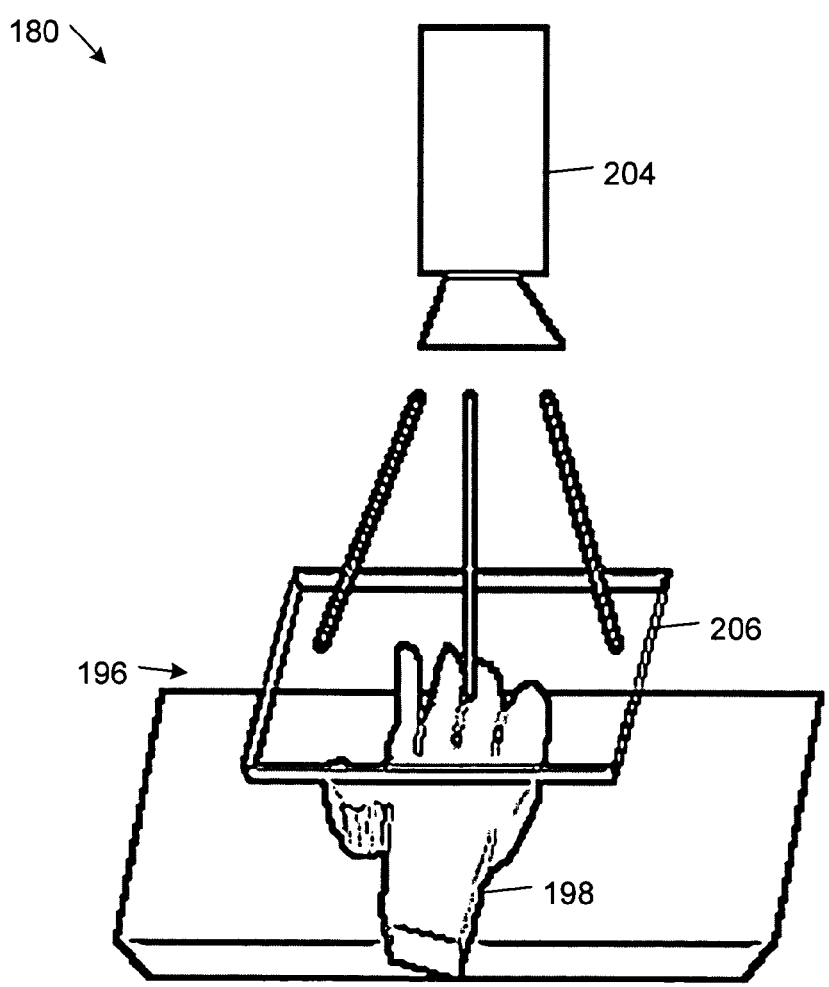
FIG. 15B is an implementation of the machine interface embodiment of FIG. 14 in which the images are projected onto a surface above the interactive space.

As shown in FIGS. 15A and 15B, the machine interface system 180 may be incorporated into a desktop display system. In the implementation of FIG. 15A, an active-type of imaging display 200 is embedded in a desktop surface 202. In the implementation of FIG. 15B, a projector 204 projects images onto a projection-type of imaging display 206, which is positioned above a desktop surface 208. In each implementation, a user moves his or her hand 198 behind the display in the interactive space 196 to control the displayed images and input instructions into the system.

III. Conclusion

The methods described herein may be performed by a computer processor executing instructions organized, for example, into process modules to carry out these methods by operating on input data and generating output.

Other embodiments are within the scope of the claims.

What is claimed is:

1. A method of interfacing with a machine, comprising:
   at each of multiple capture times, contemporaneously acquiring a respective image from each of multiple fields of view defining an interactive space to create a respective set of contemporaneous images;
   detecting an input target in the acquired images;
   computing two-dimensional coordinates of the input target detected in the acquired images;
   constructing a spatiotemporal input data structure linking each of the capture times to the computed two-dimensional coordinates of the input target in each of the contemporaneously acquired images in a respective one of the sets of contemporaneous images;
   processing the spatiotemporal input data structure to identify an input instruction; and
   executing the identified input instruction on the machine.

2. The method of claim 1, wherein images of the interactive space are acquired from at least one stereoscopic pair of fields of view directed along substantially parallel axes intersecting the interactive space.

3. The method of claim 1, wherein images of the interactive space are acquired from at least three different fields of view.

4. The method of claim 1, wherein detecting the input target in the acquired images comprises comparing values of pixels in the acquired images to at least one threshold pixel value.

5. The method of claim 4, wherein computing coordinates of the input target comprises computing coordinates of centroids of respective groups of pixels in the acquired images with values greater than the at least one threshold pixel value.

6. The method of claim 4, wherein detecting the input target in the acquired images comprises segmenting foreground pixels from background pixels in the acquired images.

7. The method of claim 1, further comprising computing calibration parameters for the multiple fields of view.

8. The method of claim 7, wherein computing coordinates of the detected input target comprises computing three-dimensional coordinates of the input target in the interactive space based on the computed two-dimensional coordinates and the computed calibration parameters.

9. The method of claim 8, wherein the spatiotemporal input data structure additionally links each of the capture times to respective three-dimensional coordinates of the input target computed from the computed two-dimensional coordinates of the input target in each of the contemporaneously acquired images in a respective one of the sets of contemporaneous images.

10. The method of claim 1, further comprising acquiring color values of the detected input target in the acquired images.

11. The method of claim 10, wherein the spatiotemporal input data structure additionally links each of the capture times to respective color values determined from the contemporaneously acquired images in a respective one of the sets of contemporaneous images.

12. The method of claim 1, wherein the spatiotemporal input data structure is constructed in the form of a linked list of data records.

13. The method of claim 1, wherein processing the spatiotemporal input data structure comprises identifying traces of the input target in the interactive space, each trace being defined by a respective set of connected data items in the spatiotemporal input data structure.

14. The method of claim 13, wherein identifying traces comprises detecting state change events and segmenting traces based on detected state change events.

15. The method of claim 13, wherein identifying traces comprises computing coordinates of bounding regions encompassing respective traces.

16. The method of claim 15, wherein the computed bounding region coordinates are two-dimensional coordinates of areas in the acquired images.

17. The method of claim 15, wherein the computed bounding region coordinates are three-dimensional coordinates of volumes in the interactive space.

18. The method of claim 13, wherein the spatiotemporal input data structure is processed to interpret the identified input target traces.

19. The method of claim 18, further comprising comparing an identified trace to a predefined representation of an input gesture corresponding to a respective input instruction.

20. The method of claim 19, wherein processing the spatiotemporal input data structure comprises translating the trace into a predefined alphanumeric character.

21. The method of claim 18, further comprising comparing an identified trace to a location in the interactive space corresponding to a virtual interactive object.

22. The method of claim 21, wherein the virtual interactive object corresponds to a virtual machine instruction input.

23. The method of claim 22, wherein the virtual machine instruction input is predefined.

24. The method of claim 22, further comprising constructing the virtual machine instruction input in response to processing of at least one identified input target trace.

25. The method of claim 22, wherein the virtual machine instruction input corresponds to a respective mode of interpreting traces.

26. The method of claim 1, wherein executing the identified input instruction comprises displaying an image in accordance with the identified input instruction.

27. The method of claim 26, wherein the displaying comprises displaying a combination of image data generated based on the acquired images and machine-generated virtual image data.

28. The method of claim 26, further comprising displaying a sequence of images at the display location showing a virtual object being manipulated in accordance with one or more identified input instructions.

29. The method of claim 1, further comprising interpolating between ones of the images contemporaneously acquired from ones of the fields of view to generate a synthetic view of the interactive space.

30. A method of interfacing with a machine, comprising:
acquiring sets of contemporaneous images of an interactive space from multiple respective fields of view;
detecting an input target in the acquired images;
computing coordinates of the input target detected in the acquired images;
constructing a spatiotemporal input data structure linking input target coordinates computed from contemporaneous images to respective reference times;
processing the spatiotemporal input data structure to identify an input instruction; and
executing the identified input instruction on the machine; and
interpolating between fields of view to generate a synthetic view of the interactive space.

31. A system for interfacing with a machine, comprising:
multiple imaging devices configured to contemporaneously acquire, at each of multiple capture times, a respective image from each of multiple fields of view defining an interactive space to create a respective set of contemporaneous images; and
a processing module configured to detect an input target in the acquired images, compute two-dimensional coordinates of the input target detected in the acquired images, construct a spatiotemporal input data structure linking each of the capture times to the computed two-dimensional coordinates of the input target in each of the contemporaneously acquired images in a respective one of the sets of contemporaneous images, process the spatiotemporal input data structure to identify an input instruction, and execute the identified input instruction on the machine.

32. A machine-readable medium storing machine-readable instructions for causing a machine to:
at each of multiple capture times, contemporaneously acquire a respective image from each of multiple fields of view defining an interactive space to create a respective set of contemporaneous images;
detect an input target in the acquired images;
compute two-dimensional coordinates of the input target detected in the acquired images;
construct a spatiotemporal input data structure linking each of the capture times to the computed two-dimensional coordinates of the input target in each of the contemporaneously acquired images in a respective one of the sets of contemporaneous images;
process the spatiotemporal input data structure to identify an input instruction; and
execute the identified input instruction on the machine.

33. A method of interfacing with a machine, comprising:
displaying an image at a display location disposed between a viewing space and an interactive space, wherein the displayed image is viewable from a perspective in the viewing space;
acquiring images of the interactive space from a field of view directed toward the interactive space along an optical axis intersecting a central area of the display location;
detecting an input target in the acquired images;
computing coordinates of the input target detected in the acquired images;
identifying an input instruction based on the computed input coordinates; and
executing the identified input instruction on the machine.

34. The method of claim 33, wherein the display location corresponds to a display area of a portable electronic device.

35. The method of claim 33, wherein the display location corresponds to a display area embedded in a desktop surface.

36. The method of claim 33, wherein displaying the image comprises projecting the image onto a surface.

37. The method of claim 33, wherein acquiring images comprises acquiring images of the interactive space from at least one field of view disposed between the display location and the interactive space.

38. The method of claim 33, wherein acquiring images comprises acquiring images of the interactive space from multiple fields of view.

39. The method of claim 38, further comprising interpolating between fields of view to display an image at the display location corresponding to a synthetic view of the interactive space.

40. The method of claim 38, further comprising computing calibration parameters for the multiple fields of view.

41. The method of claim 40, wherein computing coordinates of the detected input target comprises computing three-dimensional coordinates of the input target in the interactive space based on the computed calibration parameters.

42. The method of claim 33, wherein detecting the input target in the acquired images comprises comparing values of pixels in the acquired images to at least one threshold pixel value.

43. The method of claim 42, wherein computing coordinates of the input target comprises computing coordinates of centroids of respective groups of pixels in the acquired images with values greater than the threshold.

44. The method of claim 42, wherein detecting the input target in the acquired images comprises segmenting foreground pixels from background pixels in the acquired images.

45. The method of claim 33, wherein computing coordinates of the detected input target comprises computing two-dimensional coordinates of the input target detected in the acquired images.

46. The method of claim 33, wherein identifying an input instruction comprises identifying traces of the input target in the interactive space.

47. The method of claim 46, wherein identifying traces comprises detecting state change events and segmenting traces based on detected state change events.

48. The method of claim 46, wherein identifying traces comprises computing coordinates of bounding regions encompassing respective traces.

49. The method of claim 48, wherein the computed bounding region coordinates are two-dimensional coordinates of areas in the acquired images.

50. The method of claim 48, wherein the computed bounding region coordinates are three-dimensional coordinates of volumes in the interactive space.

51. The method of claim 46, wherein identifying the input instruction comprises interpreting the identified input target traces.

52. The method of claim 51, further comprising comparing an identified trace to a predefined representation of an input gesture corresponding to a respective input instruction.

53. The method of claim 52, wherein processing the spatiotemporal input data structure comprises translating the trace into a predefined alphanumeric character.

54. The method of claim 51, further comprising comparing an identified trace to a location in the interactive space corresponding to a virtual interactive object.

55. The method of claim 54, wherein the virtual interactive object corresponds to a virtual machine instruction input.

56. The method of claim 55, wherein the virtual machine instruction input is predefined.

57. The method of claim 55, further comprising constructing the virtual machine instruction input in response to processing of at least one identified input target trace.

58. The method of claim 55, wherein the virtual machine instruction input corresponds to a respective mode of interpreting traces.

59. The method of claim 33, wherein executing the identified input instruction comprises displaying an image at the display location in accordance with the identified input instruction.

60. The method of claim 59, wherein the displayed image comprises a combination of image data generated based on the acquired images and machine-generated virtual image data.

61. The method of claim 59, further comprising displaying a sequence of images at the display location showing a virtual object being manipulated in accordance with one or more identified input instructions.

62. A system of interfacing with a machine, comprising:
a display configured to present an image at a display location disposed between a viewing space and an interactive space, wherein the displayed image is viewable from a perspective in the viewing space;
at least one imaging device configured to acquire images of the interactive space from a field of view directed toward the interactive space along an optical axis intersecting a central area of the display location; and
a processing system configured to detect an input target in the acquired images, compute coordinates of the input target detected in the acquired images, identify an input instruction based on the computed input coordinates, and execute the identified input instruction on the machine.

63. A machine-readable medium storing machine-readable instructions for causing a machine to:
display an image at a display location disposed between a viewing space and an interactive space, wherein the displayed image is viewable from a perspective in the viewing space;
acquire images of the interactive space from a field of view directed toward the interactive space along an optical axis intersecting a central area of the display location;
detect an input target in the acquired images;
compute coordinates of the input target detected in the acquired images;
identify an input instruction based on the computed input coordinates; and
execute the identified input instruction on the machine.

* * * * *